Sept. 4, 1928.

W. S. ADAMS 1,683,516

BRAKE ROD

Filed June 7, 1926

Inventor:-
Walter S. Adams,
by his Attorneys,

Patented Sept. 4, 1928.

1,683,516

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

BRAKE ROD.

Application filed June 7, 1926. Serial No. 114,259.

My invention relates to certain improvements in rods that connect the two levers of a railway brake mechanism, particularly the brakes as applied to swivel trucks of cars.

The object of the invention is to provide means for frictionally preventing the rod from turning in the heads which are connected to the levers after the rod has been adjusted to properly locate the brake-shoes in position in respect to the wheels.

Figure 1:
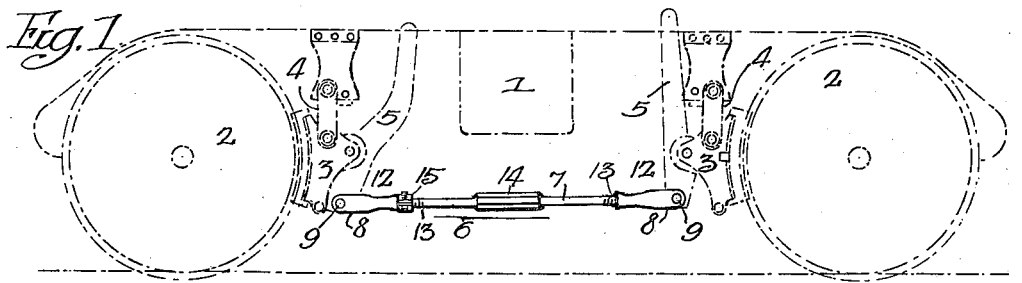
Fig. 1 is a side view in dotted lines of a railway passenger car truck and showing my improved brake-rod in full lines.

Referring to Fig. 1, 1 is the frame of a car-truck; 2 are the wheels; 3 are the brake-shoes suspended from the frame by links 4; and 5 are the brake-levers to which the brake-shoes are pivotally fastened, connecting the levers to the brake-rod 6 to which my invention is applied.

This rod is made in three parts, a central rod portion 7 and head portions 8—8. These head portions are connected by pins 9 to the brake-levers 5, as clearly shown in Fig. 1. Each head portion has an internal screw-thread 10, and back of the threaded portion is a cavity 11 for a lubricant, which can be fed into the cavity through an opening closed by a plug 12. By this construction the threaded portion is kept lubricated at all times.

The central rod portion 7 is threaded at each end as at 13, and has a hexagonal enlargement 14. This enlargement may be otherwise formed so as to receive a wrench if desired. On turning the rod portion 7 the heads 8 are moved either towards or from each other, depending in which direction the rod is turned.

In order to prevent the rod turning in the heads due to the vibration of the truck, a frictional clamping device 15 is provided, which has an internal screw thread adapted to the thread 13 of the rod, and the frictional clamping device is so adjusted that, while the rod can be turned by a wrench or other force, it cannot turn in the heads accidentally.

This frictional clamping device consists of two members 17 and 18 connected by bolts 19 which pass through openings in the said members. Between the nuts 20 on the bolts and the member 18 are springs 21, and beyond the nuts are cotter-pins 22. These cotter-pins prevent the nuts from accidentally working off the bolts.

Figure 2:
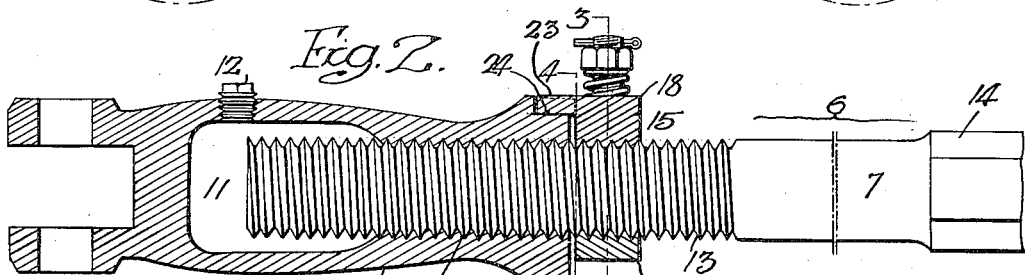
Fig. 2 is an enlarged sectional view of the head and frictional locking device mounted on the rod.
Figure 3:
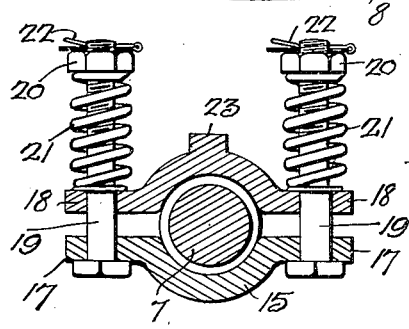
Fig. 3 is a sectional view on the line 3—3, Fig. 2.
Figure 4:
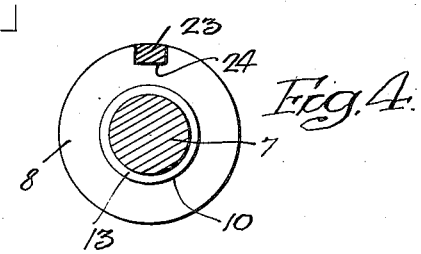
Fig. 4 is a sectional view on the line 4—4, Fig. 2.
Figure 6:
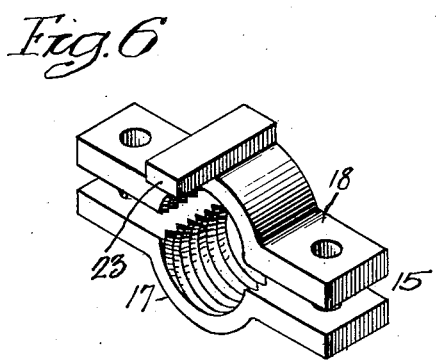
Fig. 6 is a perspective view showing the two parts of the frictional clamping member.
Figure 5:
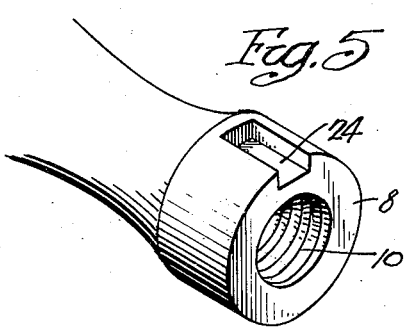
Fig. 5 is a perspective view of one end of one of the heads.

In order to prevent the clamping device from turning independently of the head 8, the member 18 has a projection 23 which extends into a notch 24 in the end of the head. The clamping member is preferably located a short distance from the end of the head as shown in Fig. 2.

By the above described mechanism, the central rod portion 7 can be turned with force so as to adjust the heads towards or from each other, but the nuts 20 can be so adjusted as to compress the springs 21 to such an extent that the rod portion 7 will be frictionally held against accidental turning.

While I prefer to locate a frictional member at each end of the rod adjacent to a head, in some instances a single frictional member may be used without departing from the essential features of the invention; and while I have shown both portions 17 and 18 of the frictional member threaded to engage the rod, in some instances only one portion may be threaded if found desirable.

I claim:—

1. A threaded clamping member made in two parts, one part having a projection adapted to a notch in a threaded head mounted on the same threaded rod as the clamping member; bolts extending through the two parts of the clamping member; and springs on the bolts for exerting a yielding pressure to frictionally retain the clamping member on the ord.

2. A threaded clamping member made in two parts, one part having a projection adapted to a notch in a threaded head mounted on the same threaded rod as the clamping member; bolts extending through the two parts of the clamping member; springs on the bolts for exerting a yielding pressure to frictionally return the clamping member on the rod; and means for adjusting the springs to regulate the friction of the clamping member.

WALTER S. ADAMS.